United States Patent
Sherwood (10) Patent No.: US 6,273,932 B1
(45) Date of Patent: Aug. 14, 2001

(54) CONTINUOUS METAL MELTING PROCESS

(76) Inventor: William Lyon Sherwood, 2 Tamath Crescent, Vancouver (CA), V6N 2C9

(*) Notice: Subject to any disclaimer, the term of this patent is extended or adjusted under 35 U.S.C. 154(b) by 0 days.

(21) Appl. No.: 09/313,789

(22) Filed: May 18, 1999

Related U.S. Application Data (60) Provisional application No. 60/085,934, filed on May 19, 1998.

(51) Int. Cl.$^7$ .................................................. C22B 7/04
(52) U.S. Cl. ............................................. 75/414; 75/477
(58) Field of Search ........................... 75/476, 477, 414, 75/485

(56) References Cited

U.S. PATENT DOCUMENTS

| | | | |
|---|---|---|---|
| 3,436,066 | * | 4/1969 | Bouchet ................................ 75/476 |
| 3,740,044 | * | 6/1973 | Uemlianin ............................ 75/476 |
| 5,542,963 | * | 8/1996 | Sherwood ............................ 75/382 |

* cited by examiner

Primary Examiner—Roy King
Assistant Examiner—Tima McGuthry-Banks (57) ABSTRACT

A continuous process is provided for rapid melting of a variety of virgin and recycled ferrous and non-ferrous metals. This is accomplished by distributing the introduction of the unmelted charge materials and hence the melting heat requirements along an elongate gas-solid-liquid reaction zone within a rotary furnace, according to the distribution of heat available to effect melting. In the case of fine-sized metal charge materials, fluxes and additive reagents, this charge distribution is implemented by traversing of the nozzle jet, as directed to penetrate into the metal and slag bath from a solids injection lance, successively backwards and forwards and, in the case of coarse-sized materials, by traversing of the discharge from an oscillating conveyor. A preferred embodiment includes longitudinal extension of the furnace to include a gas-liquid reaction zone adapted for conducting refining reactions and adjusting metal temperature prior to discharging, as heated by a burner generating hot furnace gases which flow countercurrent to the general metal movement. The discharge of liquid metal and slag can be via tap hole, vacuum siphon or overflowing the annular lip of the discharge opening. The direct introduction of heat and selective introduction of oxygen along the gas-solid-liquid reaction zone is also preferred for effecting substantially complete combustion of furnace gases to $CO_2$ and $H_2O$ before exhausting from the furnace. Recirculation of a major portion of the exhaust gases into the gas-liquid reaction zone is an optional feature.

18 Claims, 8 Drawing Sheets

CONTINUOUS METAL MELTING PROCESS

This application is a continuation of provisional application No. 60/085,934 filed May 19, 1998.

The invention relates to melting of metals and, more particularly, to a rotary furnace process and apparatus applicable to continuous melting of predominantly metallic charge materials.

Known commercial melting processes have inherent processing difficulties and disadvantages only partly overcome by improvement to design and operating practice. As a ferrous melting example, in electric-arc furnace (EAF) melting of iron and steel scrap, unmelted charge materials are heated to melting temperature with solid surfaces contacting ambient air or hot oxidizing gases, thereby generating oxide particulates and lowering yield. The heat input is focused on a small area within the furnace relative to the total area occupied by the charge materials. Furthermore, carbon monoxide generated by oxygen injection into the metal bath is only partially burned to carbon dioxide by post-combustion before exit from the EAF, and only a fraction of the heat so released is transferred back into the charge. Cupola melting has like disadvantages, as well as limitation to production of cast iron, rather than steel. As a nonferrous example, reverberatory aluminum melting furnaces are widely applied commercially and focus the location of unmelted charge in a small area in relation to the sources and broad distribution of available heat in the furnace.

Elongated rotary melting furnaces employing a partially melted bath into which a solid charge is fed overcome some of the above deficiencies by means of continuous bath stirring and advancing action, in combination with efficient flame-to-wall, followed by wall-to-charge heat transfer during each furnace rotation. Access for introduction of the metallic charge materials, fluxes and reagents into the process, however, is only via annular furnace end openings, whereas the process mass transfer, heat transfer and process chemical reaction requirements vary and are distributed along the length of the reaction zones. As an example, when cold charge materials are introduced into a partially melted metal bath only adjacent to the entry opening, unmelted material may aggregate, creating islands of partially melted material and the like when, at the same time, charge further along the furnace is fully melted and becoming overheated. Unmelted islands of metal exposed to hot furnace gases are also subject to increased oxidation and loss as oxide particulates. Such problems obviously represent deficiencies in the control of process chemical reactions, mass transfer and heat transfer, and can also be a restriction on the maximum charging and production rates obtainable. It is therefore a principal object of the invention to distribute the melting heat requirement of unmelted charge materials along the elongated reaction zones according to the distribution of heat available to effect melting, with the corollary object of fast melting of the metallic charge materials.

Metallic charge materials characteristically carry varying percentages of metal oxides and other impurities as metal oxides, other metals, other compounds, dissolved gases, other elements such as phosphorous, sulphur and the like. Fluxes and additive reagents are required as components of the charge materials for reaction with these impurities, along with the metallic charge during processing, to obtain effective process parameters and desired end product composition following melting. Perhaps the most common example of an additive reagent is carbon for reduction of metal oxides to increase the yield of metal and/or for alloying the metal to obtain a specific range of dissolved carbon in the melt. It is naturally desirable that the carbon be introduced at the most effective locations to obtain the desired process reactions, such as reaction with metal oxides or oxygen, evolving carbon monoxide (CO) into the furnace gases, and then effecting a high degree of CO post-combustion (PCD), with a good heat transfer efficiency (HTE) into the furnace charge of the heat so liberated prior to the furnace gases exiting the furnace, and for control of the product composition. It is thus another principal object of the invention to distribute the introduction of fluxes and reagents along elongated process reaction zones according to the distribution of process chemical reaction requirements.

The invention provides a process and apparatus for continuous metal melting in a horizontally-disposed elongate rotary furnace comprising maintaining a partially melted bath of metal carrying a floating layer of slag in an elongate gas-solid-liquid reaction zone heated by a hot gas stream passing over the metal and slag within the furnace; conveying solid charge materials comprising metallic materials, fluxes and additive reagents through an annular furnace end opening and along the gas-solid-liquid reaction zone and downwardly projecting them into the bath; traversing the position of said downwardly projecting successively backwards and forwards thereby distributing the entry location of charge materials into the bath along a longitudinal traverse span, and allowing liquid metal to flow out of the gas-solid-liquid reaction zone thereby providing for replenishing the bath with fresh solid materials. Said traverse span preferably comprises a major portion of the length of the gas-solid-liquid reaction zone.

When applied to granular or pelletized charge materials less than about 3 cm. in size, for example, DRI pellets, granular iron carbide, pulverized coal, lime, crushed and screen limestone and ferroalloy additives, said conveying suitably comprises entraining the charge materials and propelling them by pressurized carrier gases through a solids injection lance cantilevered longitudinally within the hot gas stream in the gas-solid-liquid reaction zone and said downwardly projecting comprises issuing a jet of charge materials and carrier gases downwards from a lance nozzle into the partially melted metal bath whilst stroking the lance successively backwards and forwards distributing the entry location of charge material longitudinally along said traverse span. When applied to larger-sized charge materials, such as recycled scrap metals, pig iron, hot briquetted iron (HBI), lump coal or coke, lump fluxes and the like, said conveying suitably comprises propelling the charge materials by oscillation of an oscillating conveyor, also cantilevered along the gas-solid-liquid reaction zone, and said downward projecting comprises dropping the charge materials downwards from a discharge lip of the conveyor into the bath whilst stroking the conveyor backwards and forwards. Process requirements usually favor charging by a combination of oscillating conveyor and solids injection lance, in which case some overlapping of the lance and conveyor traverse spans is usually desirable, in which case the invention includes controlling the travel cycle time intervals and relative positions of the lance nozzle and conveyor discharge lip to avoid interference during entry between charge materials issuing from the lance nozzle and those dropping from the conveyor discharge lip at any time of passage across the common span of travel.

Further, the rate of charge material flow can also be varied at different positions along the traverse span, even including interruptions, in order to realize longitudinal distribution of charge material entry according to desired process parameters. This can be effected either by varying the velocity of stroking or, in the case of lancing, varying the lance inlet feed rate.

Metals usually carry surface oxides, for example, iron rust, DRI or other pre-reduced virgin materials may also contain substantial content of unreduced residual metal oxides. Metals are also subject to high-temperature oxidation in-process. Also, dissolved carbon is often desired as a product constituent, such as with iron and steel melting. The charge materials therefore typically include carbonaceous materials carrying carbon as an additive reagent for reduction of the oxides within the metal and slag bath, releasing carbon monoxide (CO) into the hot gas stream, which represents an unburned combustible or fuel. Selectively injecting oxygen into the hot gas stream facilitates the post-combustion of most of this CO within the process elongate reaction zones, and also recovery of the heat so released by direct in-process heat transfer back into the partially melted bath, with a PCD and HTE higher than that attainable by prior art processes.

The process and apparatus of the invention is most suitably applied with the rotary furnace length further elongated to incorporate a gas-liquid reaction zone adjoining the gas-solid-liquid reaction zone into which the liquid metal flows and accumulates for refining reactions and temperature adjustment prior to discharging from the furnace. This zone is heated by a burner from which the products of combustion form the hot gas stream flowing on into the gas-solid-liquid reaction zone countercurrent to the general movement of materials and exhausting through the annular end opening adjacent to the gas-solid-liquid reaction zone. The liquid metal may be discharged by periodically stopping the furnace rotation and opening a tap-hole discharging into a ladle or, alternatively, siphoning the metal continuously or semi-continuously via a refractory tube inserted into the metal through the furnace annular end opening entering an adjacent vacuum vessel external to the furnace, from which the metal is withdrawn for casting or further processing. Slag may be discharged by overflowing the lip of an annular end opening, including skimming as required or optionally assisted by end-wise furnace tilting through a small angle or, alternatively by a vacuum slag removal system such as described in my U.S. Pat. No. 5,305,990.

The process and apparatus is applicable to melting of various metals, for example, ferrous metals comprising iron and steel scrap, pig iron, DRI pellets, HBI, and also various virgin or recycled forms of non-ferrous metals such as copper, aluminum, lead, zinc, chromium, nickel, tin and manganese. Mixtures of metals and metal oxides can be processed and it is adaptable to acidic or basic slag and refractory practice. It accommodates a wide range of charge material sizes, ranging from fine granular particles charge by pneumatic injection up to conveyor-sized pieces of recycled scrap metals. It facilitates continuous melting whilst retaining the options of discharging product either continuously, intermittently or batch-wise. It also facilitates high heat transfer rates throughout the process reaction zones and avoids localized overheating or undercooling, as well as provides good metal-slag interaction towards composition approaching chemical equilibrium to realize high product yields and consistent chemical composition. The invention therefore represents a fast, clean, quiet, thermally efficient and versatile technology for metal melting requirements.

A BRIEF DESCRIPTION OF THE DRAWINGS

Various other objects, features and advantages of the process and apparatus of this invention will become apparent from the following detailed description and claims, and by referring to the accompanying drawings in which:

Figure 1:
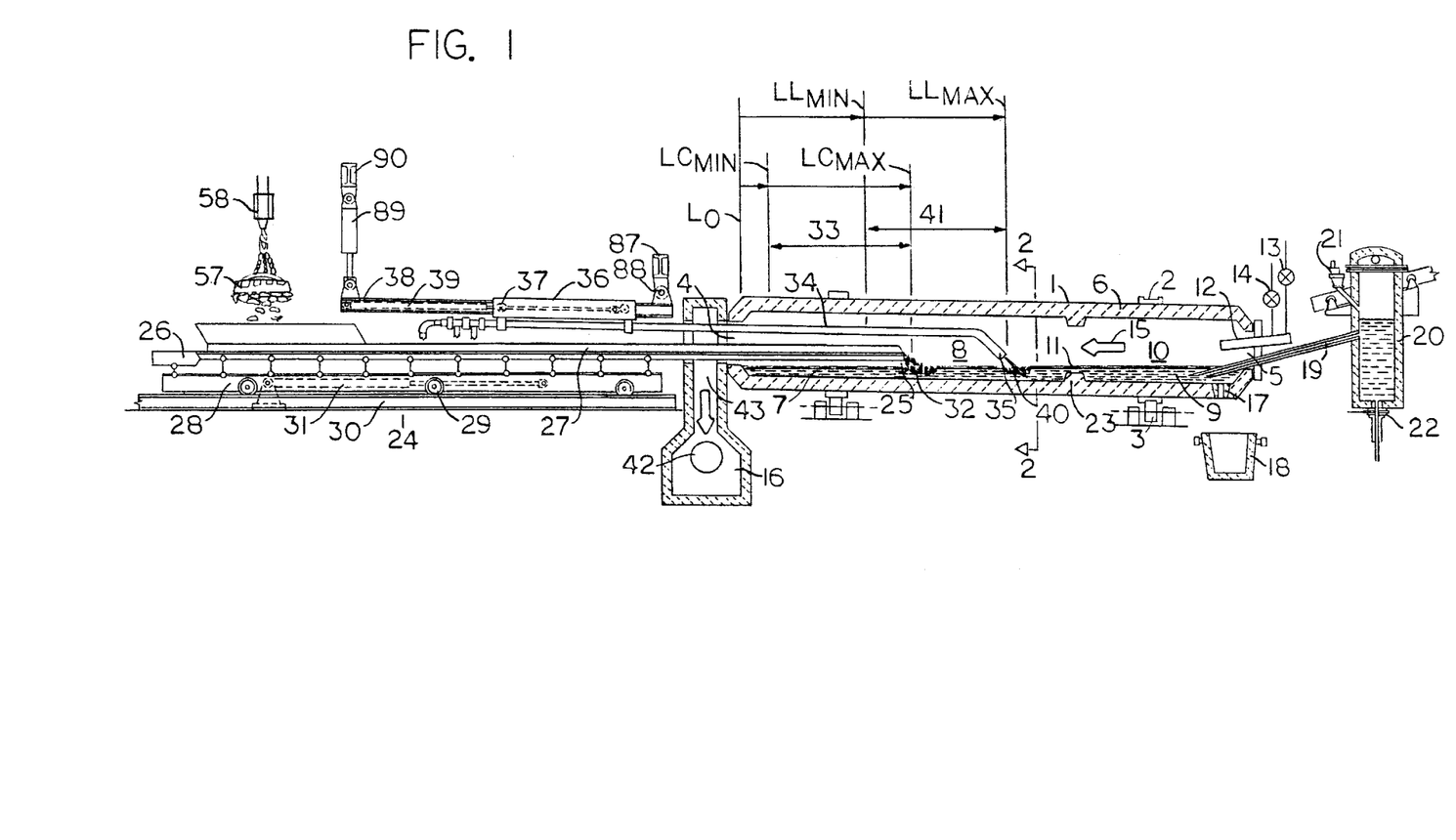
FIG. 1 is a diagrammatic side view, partly in section, illustrating typical features of the process and apparatus of this invention.

Referring to FIG. 1, the elongate rotary furnace 1 with a refractory lining 6 and incorporating restricted annular end openings 4,5 is supported horizontally or with a slight incline within riding rings 2 which are carried by and rotated on rollers 3 in known manner. A partially melted metal bath 7 is maintained in a gas-solid-liquid reaction zone 8 and also a liquid metal bath 9 in a gas-liquid reaction zone 10 in the embodiment illustrated, with the baths carrying a floating layer of slag 11. The furnace is heated by burner 12 with the products of combustion from burning fuel 13 and oxygen and/or air 14 forming hot gas stream 15 passing countercurrent to the general charge movement exhausting through annular end opening 4 into conditioning chamber 16 entering exhaust duct 42 preceding a gas cleaning system and exhaustion to atmosphere. The process product liquid metal may be discharged by periodically interrupting the furnace rotation tapping via tap-hole 17 into ladle 18 or the like or, alternatively, siphoning during rotation via refractory siphon tube 19 into an adjacent vacuum vessel 20. This vessel optionally may be heated, equipped for gas injection, alloy and flux addition 21 and regulated discharge via a slide-gate 22 according to the arts of ladle and vacuum metallurgy.

Large and irregularly-shaped charge materials such as recycled scrap metals or briquetted reduced metal oxides are introduced by conveying along oscillating conveyor 24 which is cantilevered through end opening 4 and along the gas-solid-liquid reaction zone, dropping them downwards from conveyor discharge lip 25 into the partially melted metal bath 7. The feed rate can be controlled by various means, such as a weighblock 58 as illustrated carrying a lifting magnet 57 for ferrous metals, or by other means of charging known quantities at controlled intervals. Various types of weighfeeders apply also to non-magnetic materials for loading conveyor 24, particularly for fluxes and additive reagents.

A preferred embodiment of conveyor 24 is a horizontally oscillating type in which oscillator drive 26 oscillates conveyor deck 27 back and forth in short strokes relative to base 28 at high frequency and a controlled cycle, according to known practice in the art of conveying. The cantilevered portion of the conveyor deck is double-walled and baffled applying internal forced water cooling. Conveyor 24 also rides on rollers 29 running on tracks 30 which are substantially parallel to the axis of furnace 6. By stroking a hydraulic conveyor traversing cylinder 31 or equivalent, the position of charge material entry 32 is longitudinally distributed along traverse span 33 of gas-solid-liquid reaction zone 8.

Finer-sized materials consistently smaller than about 3 cm. are preferably introduced by entraining them in a carrier gas and conveying them pneumatically through a solids injection lance 34 injecting the charge materials downwards from lance nozzle 35 into bath 7 at a sufficient velocity to effect immersion in the metal and slag bath. In the embodiment illustrated, lance 34 is clamped to a carriage 36 which rides on rollers 37 running on track 38 which is also substantially parallel to the axis of furnace 6. By stroking hydraulic lance traversing drive cylinder 39, the position of charge material entry 40 is longitudinally distributed along traverse span 41 of gas-solid-liquid reaction zone 8. The lance 34 is usually water-cooled, but can also comprise heat resistant materials, as particularly adaptable to low melting-point alloys, such as those of aluminum or lead, or can even include the consumable type, as known in the art of injection lances. Frontal support 87 includes a pivot 88 about which the inclination of lance 34 is adjustable by cylinder 89 carried on a rear support 90, enabling adjustment of the height of nozzle 35 in relation to the slag and bath, including immersion of the nozzle in the slag, or the slag and bath, as may be preferred for certain process conditions, such as slag foaming practice. Supports 87, 90 can each be carried on a fixed jib or A-frame, or alternatively, connected on a common carriage frame, which may also be equipped to ride on wheels or tracks, adapted to provide longitudinal movement of the entire assembly into and away from furnace end opening 4.

Figure 2:
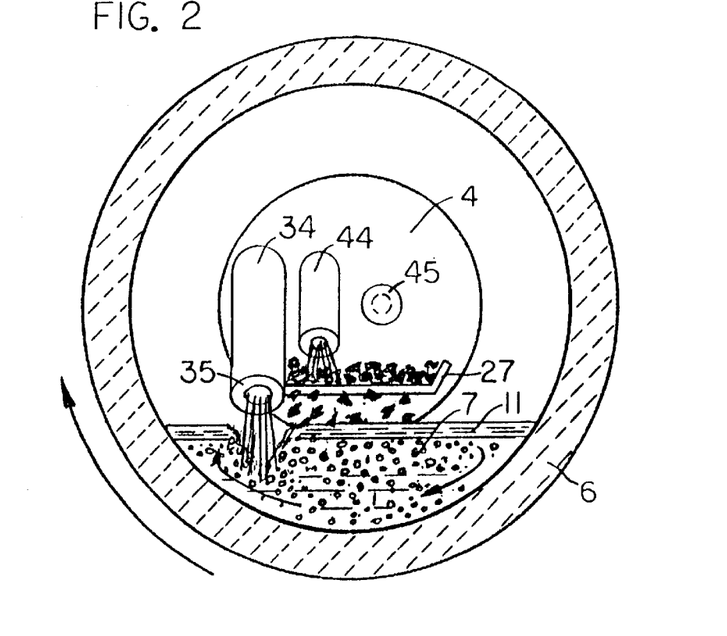
FIG. 2 is a section view along plan 2—2 of FIG. 1.

Zone 8 also is preferably heated directly by a burner 44, illustrated in FIG. 2 as juxtaposed to solids injection lance 34, which can also be mounted for adjustable longitudinal positioning. Supplementary oxygen for post-combustion may be introduced via burners 44, or also by way of a separate post-combustion lance 45, optionally also adjustably positioned. Since the hot gases within exhaust exit duct 43 are close to atmospheric pressure, dynamic sealing means such as gas-curtains are appropriate for sealing of the conveyor, lance and burner duct openings, as well as interface with end opening 4.

In the embodiment illustrated, liquid metal is passed on from the gas-solid-liquid reaction zone 8 by allowing it to flow out through the restricted passage effected by annular refractory dam 23 into the gas-liquid reaction zone 10. The dam 23 also serves to obstruct unmelted pieces of charge materials and the increased flow velocity over the channel restricted by dam 23 also substantially prevents any reverse flow of metal from zone 10 back into zone 8. In processing cases where close temperature control, refining time to obtain chemical equilibrium within bath and slag is not needed and/or processing in a supplementary vessel is needed anyway, furnace 6 could be shortened substantially eliminating zone 10 and intermediate dam 23, maintaining a partially melted bath extending from annular restricted opening 4 to opening 5, discharging metal and slag directly from gas-solid-liquid reaction zone 8.

Slag 11 may be removed by skimming or overflow over the lip of restricted opening 5, or even opening 4 in a case where slag flow countercurrent to the metal is beneficial to the process. Lengthwise tilting of furnace 6 through small vertical angles is an optional feature which is useful for the lip discharge of slag. Vacuum slag removal such as the removal system described in my U.S. Pat. No. 5,305,990 can also be applied.

Figure 3:
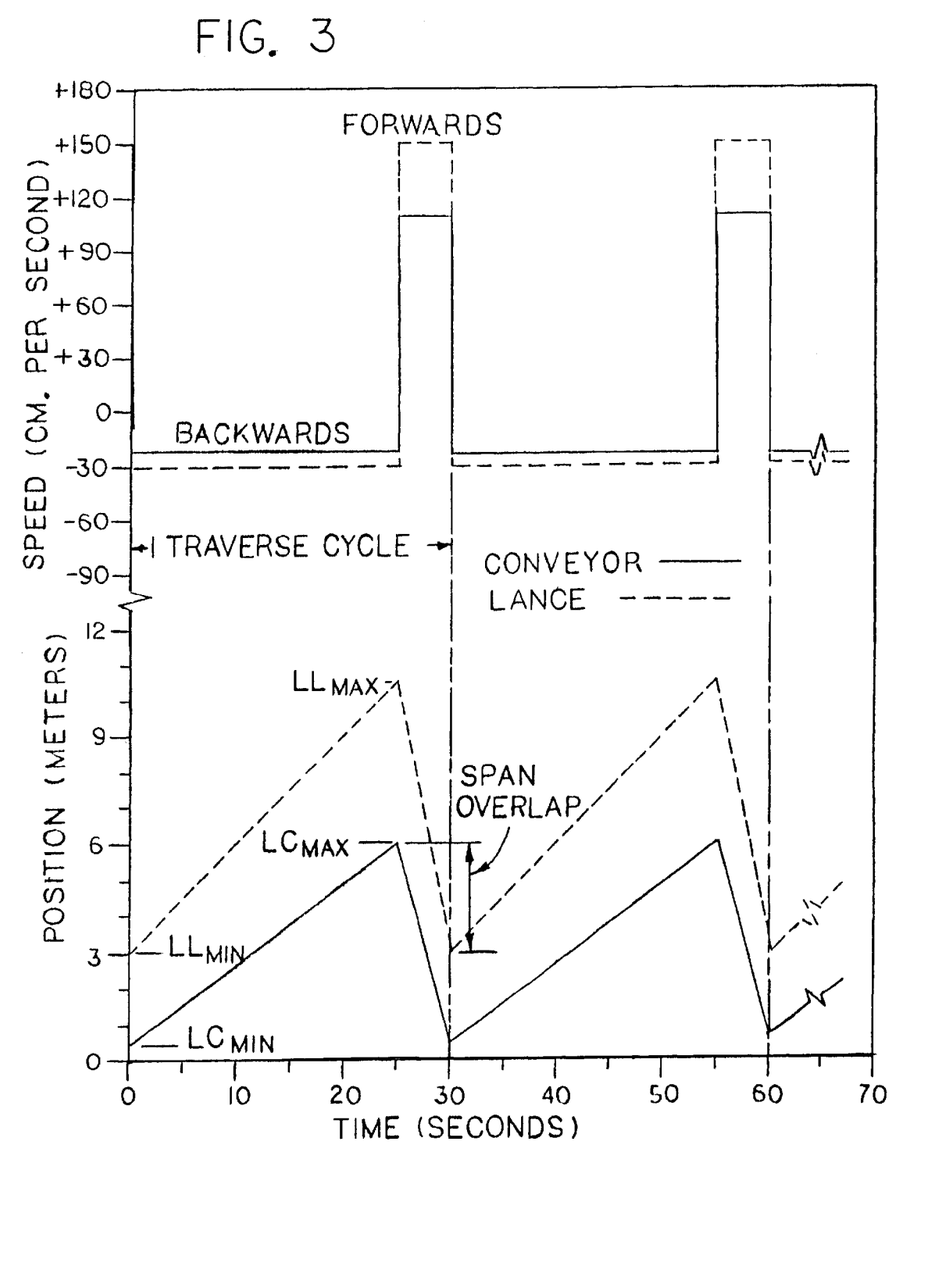
FIG. 3 is a graph showing example traverse cycles for a case in which charge materials are introduced by a combination of an oscillating conveyor and a solids injection lance.

Reference to FIG. 3 together with FIG. 1 illustrates example traverse cycles in which charge materials are introduced by the combination of an oscillating conveyor and a solids injection lance. Conveyor discharge lip 25 is traversed forward at a speed of 1 ft./sec. until it reaches LCmax, where it reverses and returns to LCmin at 3 ft./sec., when the cycle is repeated. During the same time interval, lance nozzle 35 traverses forward to LLmax at a speed of 4 ft./sec., reverses and returns to LLmin at 1.33 ft./sec. In this example, the lance and conveyor travel directionally in unison, but at different speeds over different spans. These spans also overlap, to include a common traverse span for entry of charge materials from both conveyor and lance into the bath. This cycle example employs a relative speed increase in the forwards direction to reduce the transitional effects of "double-dosing" near traverse reversal points. A wide range of traverse cycle variations are available, such as concentrating feed entry along selected areas by stroke acceleration and deceleration, step-wise speed changes, or feeding during travel in one direction only, interrupting the feed during travel in the other direction. Although the melting time in liquid metal and slag is very short for individual pellets or particles injected by lance, for example, less than a minute for DRI pellets and 10 seconds for fines, the heat so absorbed when the jet of solid charge materials is focused in one location can rapidly reduce the liquid temperature below the melting point, creating a frozen island of solid metal which interferes with process operation. Cyclical lance traversing as a feature of this invention not only eliminates this problem, but assures the maintaining of melting and process reaction rates, at any given average metal and slag bath temperature.

In addition to solids injection lance 34, gas-solid-liquid reaction zone 8 is typically heated by a burner (not shown) supplying concentrated heat for melting, and also utilizes a lance supplying post-combustion oxygen at relatively low pressure, preferably such as described in my co-pending patent application Ser. No. 08/916,395 filed Aug. 22, 1997, now abandoned (illustrated in FIGS. 2, 8 & 9). Given the typically numerous interacting process variables involved, the optimum distance of insertion of these lances into the gas-solid-liquid reaction zone is initially unknown and can vary during processing, and is therefore most suitably established by trial and error during operation. These lances therefore are preferably mounted on a variably-positioned carriage similarly to lance 34, aligned in parallel as illustrated by example cross-section FIG. 3 showing a solids injection lance 34, burner 44 and post-combustion oxygen lance 45 carried in parallel above an oscillating conveyor 27. A high-velocity bath oxygen injection lance can also be introduced separately, or as a combination with lance 45 as a variation of known combined oxygen injection lance technology.

In addition to variations in the speed of traversing, span of traversing stroke and longitudinal position of the span, the process and apparatus also provides for charging the makeup of the solids injected along different sections of the traverse span. For example, additive carbon could be programmed for injection only during the last 50 per cent of the forwards and first 50 per cent of the backwards lance stroke, as regulated by opening and closing a remotely-operated valve on the injected carbon supply line. This can obviate the need for another separate carbon injection lance whilst obtaining the desired distribution of carbon entry into the bath for a high degree of post-combustion.

Figure 4:
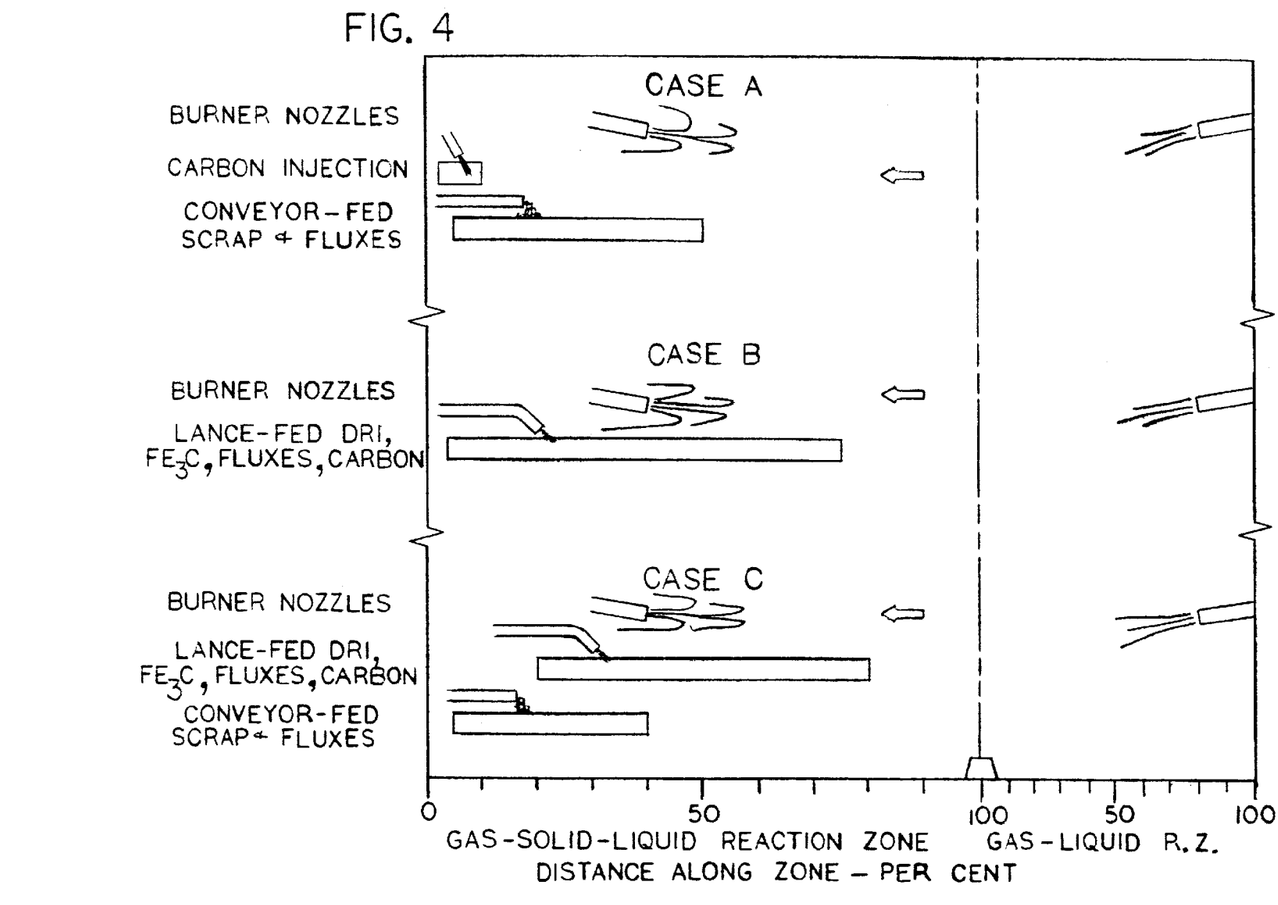
FIG. 4 presents illustrative diagrams of exemplary general longitudinal distribution of charge material entry and other process inputs for three example cases.
Figure 5:
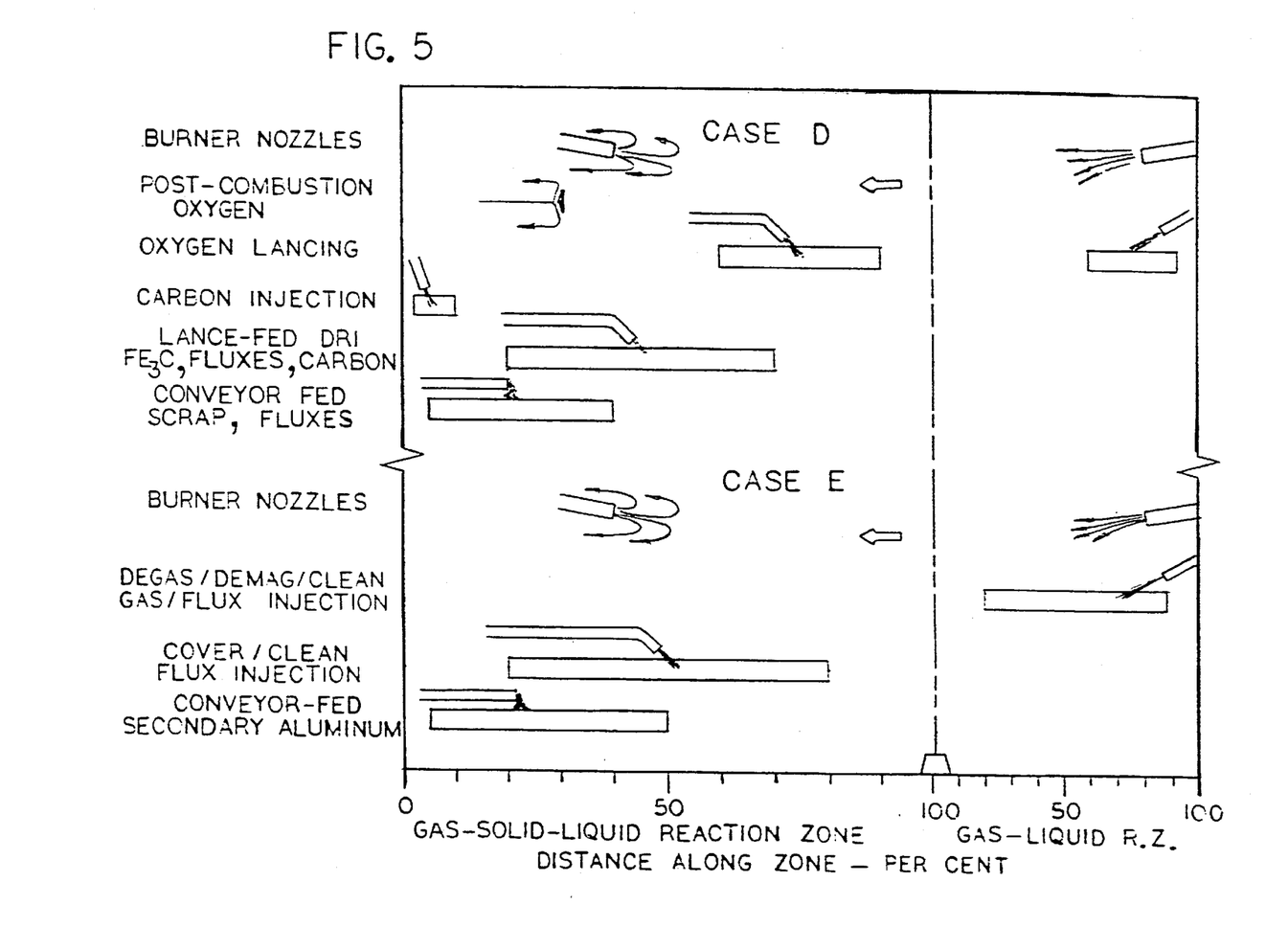
FIG. 5 presents diagrams for another two example cases.

The mode of operation and equipment configuration may be varied according to the makeup of the charge materials and the processing functions to be performed. This is illustrated by the diagram FIGS. 4 and 5 showing example distributions of the charge material entry and other inputs into the melting process. In Case A, FIG. 4, recycled ferrous scrap along with fluxes and additive reagents is distributed along the first 50 per cent of the gas-solid-liquid reaction zone by cyclical stroking of the oscillating charge material feed conveyor, relying upon the furnace rotation and inclination to distribute the unmelted materials into the balance of the zone. Carbon is shown as separately injected near the zone entry, thereby lowering the bath temperature and increasing heat transfer rate, such as described in my U.S. Pat. No. 5,163,997. Although a metallic charge normally carries some surface oxides, separately injecting post-combustion oxygen usually would only be warranted in the case of supplementary bath oxygen injection, as an optional practice in this case. Otherwise, the relatively small amounts of CO and $H_2$ generated can be reacted with supplementary burner oxygen.

In Case B, DRI and/or iron carbide as the principal charge materials are preferably fed by a pneumatic solids injection lance, along with carbon for reducing residual iron oxides, with the traverse span extending along a major portion of the gas-solid-liquid reaction zone. Case C illustrates a combination of recycled scrap charged by conveyor with granular materials charged pneumatically by solids injection lance, including overlapping spans of traverse travel. Case D, FIG. 5 illustrates the addition of supplementary bath oxygen injection, as well as separate injection of oxygen for post-combustion into the hot gas stream. Monitoring of exhaust gas temperature and composition, as well as product composition, temperature and production rate during operation facilitates selecting the most suitable inputs and their distribution. In any one of example cases A to D, the charge materials can also include metal oxides, for example, in ferrous melting, mill scale, BOF slag, raw or preprocessed EAF dust, along with additional carbon as an additive reagent for reducing the oxides to metal.

Example Case E illustrates the melting of recycled aluminum and/or primary aluminum ingot and the like which usually are of a size suitably charged by an oscillating conveyor. Exposed surfaces of either unmelted or molten aluminum oxidize rapidly at elevated temperature forming aluminum oxide dross. Fluxing agents are required to retard oxidation and also to accelerate inclusion removal, recover metallic aluminum from dross and clean oxide buildup from furnace walls. Distributing charge material entry as in the diagram example to obtain essentially immediate immersion minimizes the oxidation of unmelted aluminum. Cover fluxes to prevent oxidation of molten aluminum by the hot furnace gases typically comprise a near-eutectic KCl/NaCl mixture, often also including additive fluoride, chloride or carbonate compounds. Various fluxes are also employed as drossing fluxes, cleaning fluxes and degassing fluxes in the art of aluminum melting, for example, $MgCl_2$, various alkali fluoride and chloride salts, as well as oxygen-containing compounds for exothermic reaction. It is known that these fluxes are usually more effective when delivered by flux injection whereby they melt into small droplets within the bath offering a large specific surface area in contact with the melt as they float to the surface. Distributing the injected fluxes longitudinally along the continuous reaction zones, as in the diagram of this invention, substantially increases the proportion of the melt surfaces directly contacted by the flux droplets. The lowering of magnesium content, commonly referred to as "demagging", also is a common requirement of secondary aluminum melting, usually accomplished by sub-surface injection of chlorine-containing gases or a combination of fluxes and gases using simple gas-injection lances, or including spinning nozzles and submerged porous plugs to obtain smaller bubbles which are more evenly and widely distributed in the melt. The Case E illustration depicts how the slag covering and at least part of the degassing, cleaning and demagging functions may be conducted by distributing the injection of solids and gases longitudinally along the elongate continuous reaction zones within the rotary furnace according to the invention.

Figure 6:
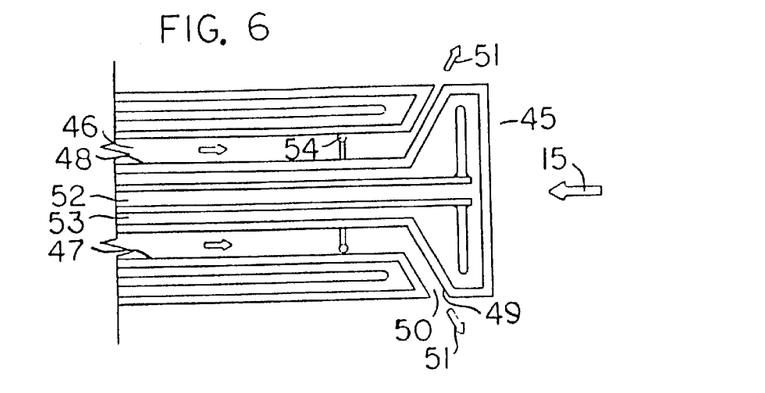
FIG. 6 is a partial sectional side view illustration of a gas stream oxygen lance injection nozzle adapted to distribute oxygen for post combustion across the gas stream.
Figure 7:
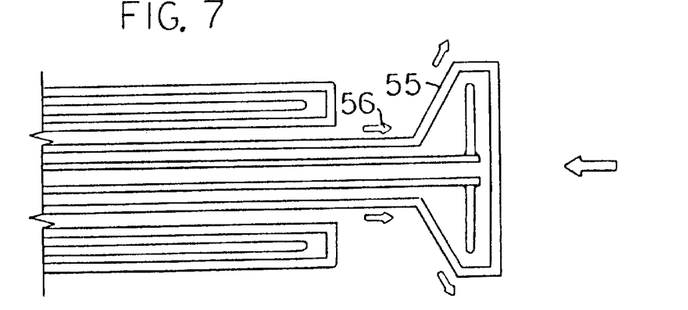
FIG. 7 illustrates an alternative embodiment of a nozzle as in FIG. 8.

FIG. 6 illustrates a preferred embodiment of a lance nozzle 45 for issuing post-combustion oxygen into the hot gas stream 15. Oxygen is introduced via annulus 46 between water-cooled cylindrical outer pipe 47 and water-cooled inner pipe 48 carrying an oxygen jet flow rate, direction and distribution control disc 49. Annular slit nozzle opening 50 is thereby defined between the end of outer pipe 47 and the back face of disc 49, through which oxygen jet 51 fans radially outwards in a continuous curtain of oxygen transversely spanning across the axially flowing gas stream. Disc 49 is preferably water-cooled, such as by cooling water supplied by internal water pipe 52 and returned via inner pipe annulus 53. Opening 50 can be shaped to enhance effectiveness of mixing with the gas stream to increase reaction with combustibles. For example, in the illustration, slit opening 50 is angled upstream at about 30° to the perpendicular, emitting a cone-shaped curtain radially outwards which is also countercurrent to the general gas stream flow 15. Also, the sector of opening 50 directing oxygen jet 51 downwards towards bath 7 is made wider than the sector directing the jet upwards, thereby delivering a higher volume of oxygen to directly intercept the CO evolving from the bath surface. The width of opening 50 and thereby the oxygen flow rate at a selected pressure and velocity, can be varied by axial location adjustment of pipe 48 by axial sliding of inner pipe locating guide 54 to different locations within outer pipe 47, for example, by applying different thicknesses of spacer washers against an entry-end flange of inner pipe 48. FIG. 7 illustrates a gas stream oxygen lance injection nozzle embodiment variation, in which a similarly-mounted disc acts only as a deflector disc 55, adapted to deflect oxygen jet 56 outwards projecting an annular oxygen curtain across the furnace gas stream cross-section.

Such gas stream oxygen injection provides for the post-combustion oxygen intersecting the bath surface transversely to the direction of metal flow, as well as the complete gas stream cross section. The hot reacted gas mixture then flows for a significant distance simultaneously in contact and heating the partly melted bath and the furnace walls which, in turn, continuously agitate the bath and pass on this wall heat from post-combustion into the bath when rotating under it. The invention thus provides the clear advantage of increasing PCD and HTE over prior art processes, for example, electric-arc furnace and oxygen converter process technologies.

Figure 8:
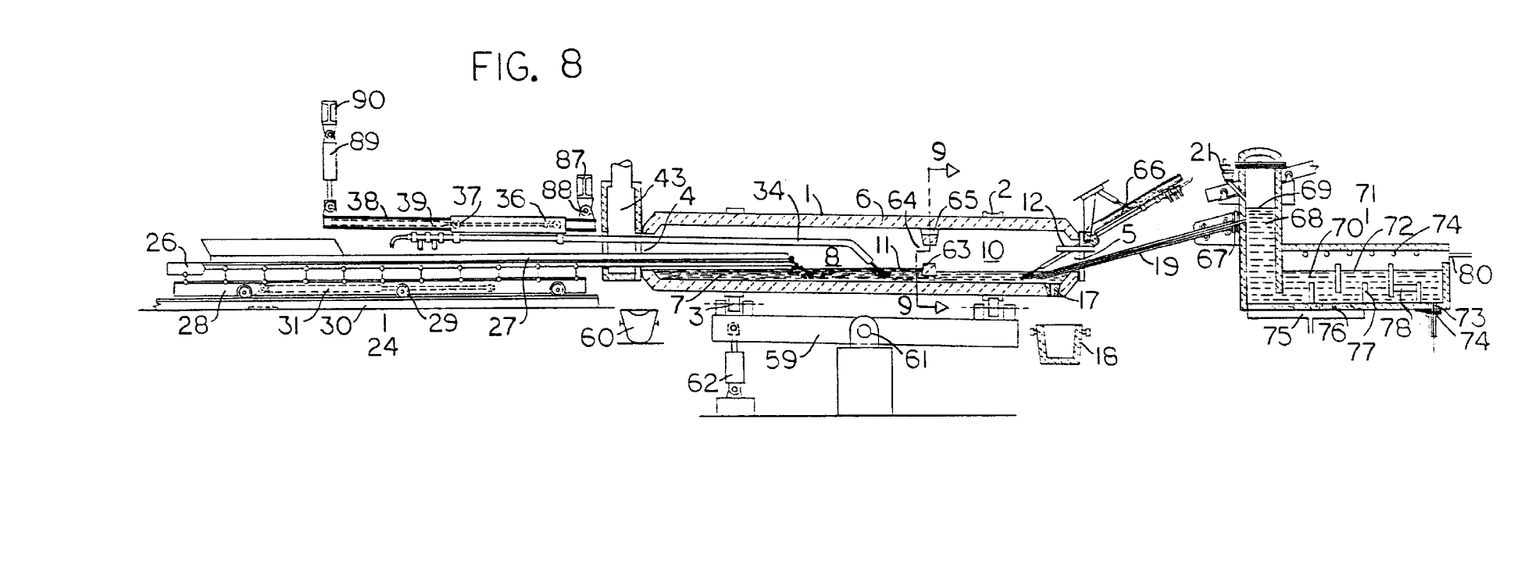
FIG. 8 is a diagrammatic side view, partly in section, illustrating additional and alternative features of the process and apparatus of this invention.
Figure 9:
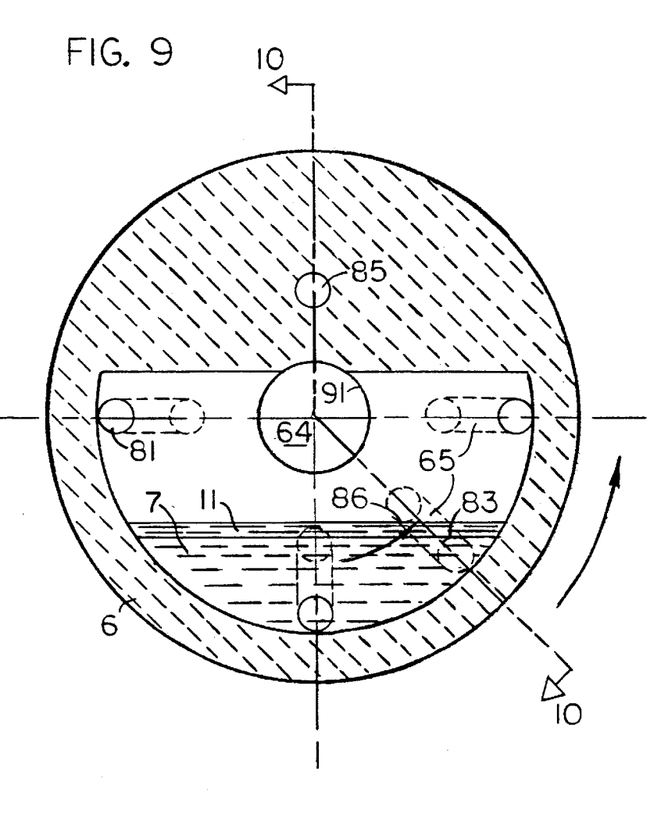
FIG. 9 is a section view along plane 9—9 of FIG. 8.
Figure 10:
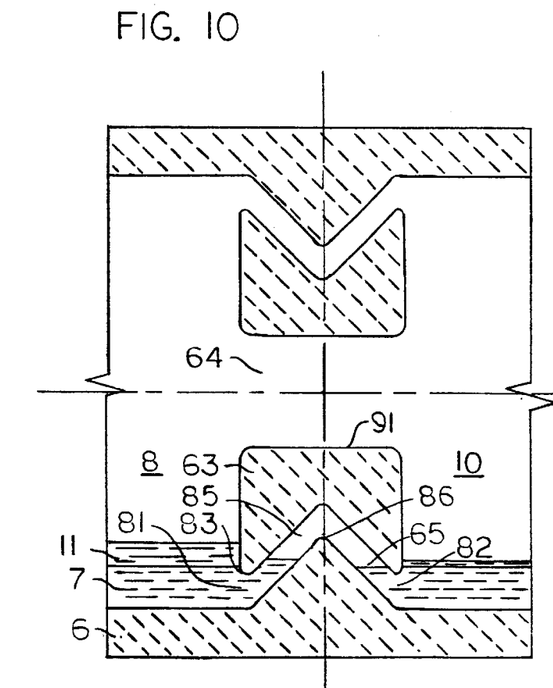
FIG. 10 is a section view along plane 10—10 of FIG. 9, with the portion of the plane below the central furnace axis seen as rotated approximately 45 degrees when the entrances into submerged channel 65 coincide with the slag layer.

Various features previously described with reference to FIG. 1 are repeated in FIG. 8, which also illustrates various additional or alternative optional features. In order to facilitate slag skimming and discharge over the lip of either end opening 4 or 5, such as into slag pot 60, as well as facilitate general access to the interior of furnace 1, it can be tiltable longitudinally about a pivotal support 61, such as by a hydraulic cylinder 62, linear actuator, or the like. Alternatively, support 61 can be positioned directly under either set of rollers 3, with actuator 62 supporting the other set. Some processing requirements favor using a slag in zone 10 having a different layer thickness and composition than the slag in zone 8. The transfer of slag between zones 8 and 10 can be restricted by the crest of an annular dam 63 sized to project above the highest level of the slag surface. One or more channels 65 through dam 63 can allow the substantially free passage of liquid metal from dam channel entrance opening 81 to dam channel exit opening 82, whilst restricting the passage of slag. Referring to FIGS. 9 and 10, in order to avoid substantial transferring of slag through channel(s) 65 when openings 81, 82 pass through the slag layer, during rotation of furnace 1, the channel 65 can be sloped upwards in the general direction radially towards the furnace axis of rotation from openings 81, 82 up to a channel interior crest 85 (not so illustrated in FIGS. 8, 11). At the two positions during each furnace revolution that the openings 81, 82 pass through the slag layer, it is seen that the channel interior crest invert 86 should be higher than the tops 83 and 84 of openings 81 and 82 respectively, preferably by a distance at least equal to the maximum thickness of the slag layer, as illustrated, invert 86 thereby acting as a barrier adapted to limit the interchange of slag between zones 8 and 10 in either direction during operation.

Fluxes, alloys and gases, such as required for metal composition adjustment and refining in zone 10, can also be injected using a longitudinally traversing lance assembly 66, as essentially analogous to lance 34. A coherent jet lance for injection of oxygen or other treatment gas, as known to maintain a narrow gas stream at high velocity for distances of 2 meters or more from the nozzle can also be employed to increase longitudinal coverage using a less extensive mechanical assembly for lance manipulation.

Optional post-treatment processing steps can be included since the objects include yielding a broad range of products having controlled and specific composition and properties. For example, the lower portion of liquid metal column 68 having its top surface 69 at a level above bath 9 governed by regulated vacuum pressure maintained within vessel 20, can be extended laterally to include a metallurgical post-treatment pool 70 confined within a lateral channel enclosure 71 through which the metal flows preceding discharge, having a pool surface 72 maintained at a lower elevation and higher pressure than surface 69. When at or near atmospheric pressure, surface 72 is typically also proximate the surface level of metal and slag 9, 11, as governed by the principles of Bernoulli's theorem. The metal may be discharged through a submerged nozzle 73. Adjustable flow rate control of a nozzle throttling slide-gate 74, metering pin or stopper rod then also controls the furnace discharge flow through siphon tube 19, at the same average rate as the metal discharge through the nozzle. Alternatively, the metal can be lip-discharged from pool 70 by overflow, in which case the furnace discharge rate requires control by other means, such as by varying the vacuum pressure within enclosure 20 or tilt control of the post-treatment assembly. Also, high vacuum pressures within enclosure 20 can remove substantial quantities of gases dissolved in the metal prior to passage into pool 70. In another variation, siphon tube 19 can be discharged directly into the evacuated space 76 over top surface 69, realizing a degree of spray degassing, but also requiring direct regulation of the discharge flow rate through tube 19 by varying vacuum pressure, or other means. Sealing of channel enclosure 71 and closing throttling valve 74 and other outlet openings facilitates the initial evacuation of vessel 20 to start metal flow. Vessel 20 can also be equipped with an entry valve 67 which is maintained closed during evacuation, then opened to allow starting flow.

As an example (see FIG. 8), aluminum processing commonly involves employing a mixture of inert gases and reactive gases for degassing and demagging the molten metal following melting, which may be introduced by way of porous plugs or from a treatment gas chamber 75 through porous refractory 76 as the metal courses through a series of baffles 77 to increase the effective length of the post-treatment channel. The metal then passes upwards through a filter 78 for removal of non-metallics and the like, then downwards discharging through a nozzle 73 having a discharge rate controlled by a flow control pin, stopper rod or throttling slide-gate valve 74. The metal being processed can be heated, such as by electric resistance heating elements 79 and the surface 72 protected from oxidation by introducing a supplementary blanket gas 80, also providing for evacuation of these gases into the exhaust gas handling and treatment system. Numerous variations of this metal-treatment system are feasible, for example, rotary gas diffusers for shearing injected treatment gases into small bubbles could be employed in addition to, or in place of, the gases introduced through porous refractory 76. Various treatment gases can be employed, for example, aluminum treatment gases typically are blends of inert nitrogen and argon with reactive chlorine and fluorine compounds, according to the art of degassing and filtration refining systems preceding pouring for casting.

Figure 11:
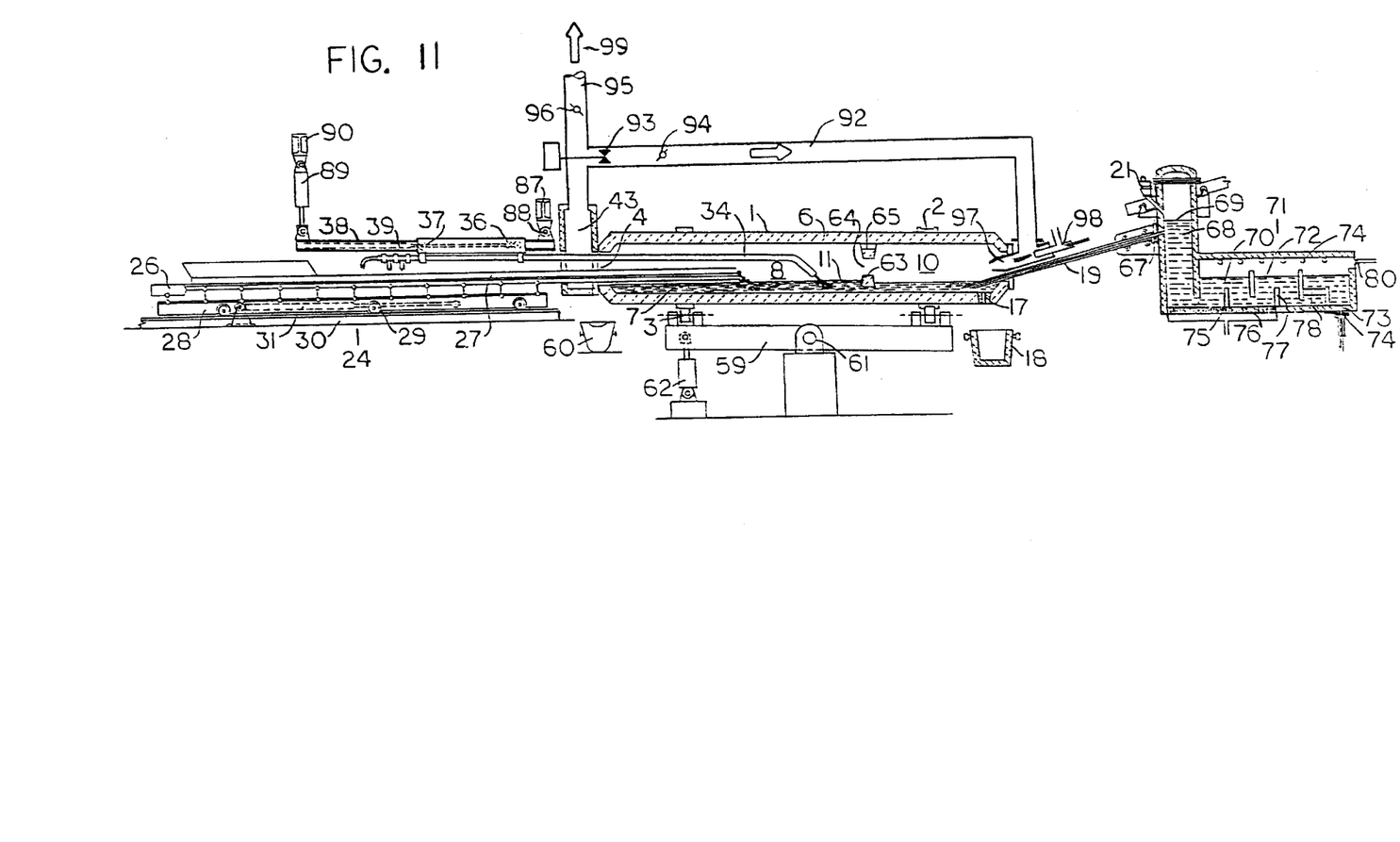
FIG. 11 is a diagrammatic side view, partly in section, illustrating off-gas recirculation into the hot gas stream comprising part of the process heat requirements.

The very high temperatures characteristic of oxy-fuel flames can be excessive when melting metals having relatively low melting points, such as aluminum and lead. Off-gas recirculation, such as illustrated in FIG. 11, can mitigate this problem. A substantial and controlled portion of the off-gases can be recirculated through off-gas recirculation duct 92, usually lined with refractory, by an off-gas recirculation blower 93, usually equipped with a water-cooled impeller. Blower 93 may be operated at a controlled variable speed, or the volume flowing may also be controlled by a damper 94, also water-cooled. The exhaust gases 99 comprising the non-recirculated off-gases pass directly through exhaust duct 95, also preferably equipped with a damper 96. Duct 92 may exit directly into the furnace, as also equipped with a separate oxy-fuel burner or, as illustrated, into a pre-combustion chamber 97 which is also fired by an oxy-fuel burner 98, with the products of combustion, in turn, discharging into the furnace reaction zones and forming the hot gas stream. The overall result is generally to decrease the average furnace and exhaust gas temperature, improving process thermal efficiency, also avoiding localized overheating and unnecessary nitrogen oxide formation. Exhaust gases 99 can also be utilized to preheat the charge materials, fuel or oxygen by recuperation, further improving the process heat economy.

I claim:

1. A process for continuous metal melting in an elongate rotary furnace having horizontal longitudinal disposition and annular end openings, characterized by the combination of the following steps:

maintaining a partially melted bath of metal carrying a floating layer of slag in an elongate gas-solid-liquid reaction zone with a hot gas stream passing over said metal and slag within said furnace;

conveying solid charge materials comprising metallic materials, fluxes and additive reagents through at least one of said end openings into said hot gas stream and along said gas-solid-liquid reaction zone;

downwardly projecting said charge materials into said bath;

traversing the location of at least a part of said downwardly projecting said charge materials and thereby distributing the entry location of said charge materials into said bath successively backwards and forwards along a longitudinal traverse span of said gas-solid-liquid reaction zone; and allowing liquid metal to flow out of said gas-solid-liquid reaction zone to provide for replenishing said bath by said conveying and downwardly projecting of said charge materials.

2. A process according to claim 1 wherein at least a portion of said solid charge materials comprise lance-fed charge materials and wherein said conveying includes entraining and propelling by pressurized carrier gases said lance fed solid charge materials through a solids injection lance cantilevered longitudinally within said hot gas stream; said downwardly projecting comprises issuing a jet of said charge materials and carrier gases from a nozzle of said lance into said bath; and said traversing comprises stroking said lance successively backwards and forwards longitudinally distributing the position of said nozzle and thereby said entry location along said traverse span.

3. A process according to claim 1 wherein at least a portion of said solid charge materials comprise lance-fed charge materials and wherein said conveying includes entraining and propelling by pressurized carrier gases said lance fed solid charge materials through a solids injection lance cantilevered longitudinally within said hot gas stream; said downwardly projecting comprises issuing a jet of said charge materials and carrier gases from a nozzle of said lance into said bath; and said traversing comprises stroking said lance successively backwards and forwards longitudinally distributing the position of said nozzle and thereby said entry location along said traverse span, and including distributing the feed rate of charge materials issuing from said jet unequally along said lance-fed portion of said traverse span by varying the flow rate of entrained charge materials during stroking of said lance, whilst maintaining a substantially constant average total feed rate of charge material across the total length of said lance-fed portion.

4. A process according to claim 1 wherein at least a portion of said solid charge materials comprise lance-fed charge materials and wherein said conveying includes entraining and propelling by pressurized carrier gases said lance fed solid charge materials through a solids injection lance cantilevered longitudinally within said hot gas stream; said downwardly projecting comprises issuing a jet of said charge materials and carrier gases from a nozzle of said lance into said bath; and said traversing comprises stroking said lance successively backwards and forwards longitudinally distributing the position of said nozzle and thereby said entry location along said traverse span, and including distributing the feed rate of charge materials issuing from said jet unequally along said lance-fed portion of said traverse span by varying the velocity of said stoking of said lance, whilst maintaining a substantially constant average total feed rate of charge material across the total length of said lance-fed portion.

5. A process according to claim 1 wherein at least a portion of said solid charge materials comprise conveyor-fed charge materials and wherein said conveying includes propelling of said conveyor-fed solid charge materials by longitudinal oscillation of an oscillating conveyor cantilevered longitudinally within said hot gas stream; said downwardly projecting comprises dropping said charge materials from a discharge lip of said conveyor into said bath; and said traversing comprises stroking said conveyor successively backwards and forwards longitudinally distributing the position of said discharge lip and thereby said entry location along said traverse span.

6. A process according to claim 1 in which said metallic materials contain metal oxides and said additive reagents include carbonaceous material, including effecting reduction of said metal oxides in said bath and slag by carbon contained in said carbonaceous material, thereby forming liquid metal in said gas-solid-liquid reaction zone and releasing carbon monoxide into said hot gas stream.

7. A process according to claim 1 in which said metallic materials contain metal oxides and said additive reagents include carbonaceous material, including effecting reduction of said metal oxides in said bath and slag by carbon contained in said carbonaceous material, thereby forming liquid metal in said gas-solid-liquid reaction zone and releasing carbon monoxide into said hot gas stream; and injecting oxygen into said hot gas stream effecting postcombustion of a major portion said carbon monoxide forming carbon dioxide prior to the exit of said hot gas stream from said gas-solid-liquid reaction zone.

8. A process according to claim 1 wherein said conveying includes propelling a portion of said solid charge materials by longitudinal oscillation of an oscillating conveyor cantilevered longitudinally within said hot gas stream; said downwardly projecting comprises dropping said portion of said charge materials from a discharge lip of said conveyor into said bath; and said traversing comprises stroking said conveyor successively backwards and forwards longitudinally distributing the position of said discharge lip and thereby the said entry location of said portion of charge materials along a conveyor-fed portion of said traverse span and also includes entraining and propelling by pressurized carrier gases another portion of said solid charge materials through a solids injection lance cantilevered longitudinally within said hot gas stream; said downwardly projecting comprises issuing a jet of said another portion of charge materials and carrier gases from a nozzle of said lance into said bath; and said traversing comprises stroking said lance successively backwards and forwards longitudinally distributing the position of said nozzle and thereby said entry location of said another portion of said charge materials along a lance-fed portion of said traverse span.

9. A process according to claim 8 wherein said lance-fed portion overlaps said conveyor-fed portion of said traverse span across a common traverse span portion of said longitudinal traverse span, including coordinating the travel cycle time intervals and positions of said lance nozzle relative to said discharge lip thereby avoiding crossing over between charge materials issuing from said lance and those dropping from said discharge lip, across said common traverse span during traversing.

10. A process according to any one of claims 1 to 8 including maintaining a gas-liquid reaction zone adjoining said gas-solid-liquid reaction zone;

maintaining a general movement of materials within said partially melted metal bath in a direction towards said gas-liquid reaction zone allowing said liquid metal to flow on into said gas-liquid reaction zone;

heating said gas-liquid reaction zone by combustion of fuel and oxygen to regulate the liquid metal temperature and also form said hot gas stream;

effecting general flow of said hot gas stream countercurrent to said general movement of materials for exhaustion through the annular end opening adjacent to said gas-solid-liquid reaction zone; and discharging hot liquid metal from said gas-liquid reaction zone.

11. A process according to any one of claims 1 to 8 wherein the total distance across said longitudinal traverse span comprises more than 50 per cent of the length of said gas-solid-liquid reaction zone.

12. A process according to any one of claims 1 to 8 including discharging of said liquid metal by siphoning through a suction tube into a vacuum chamber containing a liquid metal column under a controlled vacuum pressure; allowing said hot liquid metal to flow from said vacuum chamber into a post-treatment pool within a lateral channel enclosure under a pressure higher than said controlled vacuum pressure; introducing metallurgical treatment gases into the metal comprising said pool; and discharging said liquid metal from said pool.

13. A process according to any one of claims 1 to 8 including discharging of said liquid metal by siphoning through a suction tube into a vacuum chamber containing a liquid metal column under a controlled vacuum pressure; allowing said hot liquid metal to flow from said vacuum chamber into a post-treatment pool within a lateral channel enclosure under a pressure higher than said controlled vacuum pressure; introducing metallurgical treatment gases into the metal comprising said pool; and maintaining a continual flow of said liquid metal through said pool and discharging said metal through a submerged nozzle, also including regulating the discharge flow rate through said nozzle by throttling the nozzle opening, thereby also controlling the average metal flow rate through said siphon tube.

14. A process according to any one of claims 1 to 8 including discharging of said liquid metal by siphoning through a suction tube into a vacuum chamber containing a liquid metal column under a controlled vacuum pressure; allowing said hot liquid metal to flow from said vacuum chamber into a post-treatment pool within a lateral channel enclosure having the surface of said pool exposed to atmospheric pressure; introducing metallurgical treatment gases into the metal comprising said pool; and discharging said liquid metal from said pool.

15. A process according to any one of claims 1 to 8 including discharging of said liquid metal by siphoning through a suction tube into a vacuum chamber containing a liquid metal column under a controlled vacuum pressure; allowing said hot liquid metal to flow from said vacuum chamber into a post-treatment pool within a lateral channel enclosure under a pressure higher than said controlled vacuum pressure; filtering out non-metallic inclusions and impurities in the metal flowing through said pool by passage of said metal through a porous filter; and discharging said liquid metal from said pool.

16. A process according to any one of claims 1 to 8 including maintaining a gas-liquid reaction zone adjoining said gas-solid-liquid reaction zone;

heating said gas-liquid reaction zone by combustion of fuel and oxygen to regulate the liquid metal temperature and also form said hot gas stream;

effecting general flow of said hot gas stream countercurrent to said general movement of materials for exhaustion through the annular end opening adjacent to said gas-solid-liquid reaction zone;

obstructing the flow of said slag between said gas-solid-liquid and said gas-liquid reaction zone by maintaining the inner perimeter of an annular dam above the top surface of said layer of slag;

allowing said liquid metal to flow on into said gas-liquid reaction zone by way of at least one channel through said dam which is submerged within said bath during a portion of each revolution;

discharging slag as required through said annular end opening adjacent to said gas-solidliquid reaction zone; and discharging hot liquid metal from said gas-liquid reaction zone.

17. A process according to any one of claims 1 to 8 including maintaining a gas-liquid reaction zone adjoining said gas-solid-liquid reaction zone;

heating said gas-liquid reaction zone by combustion of fuel and oxygen to regulate the liquid metal temperature and also form said hot gas stream;

effecting general flow of said hot gas stream countercurrent to said general movement of materials for exhaustion through the annular end opening adjacent to said gas-solid-liquid reaction zone;

obstructing the flow of said slag between said gas-solid-liquid and said gas-liquid reaction zone by maintaining the inner perimeter of an annular dam above the top surface of said layer of slag;

allowing said liquid metal to flow on into said gas-liquid reaction zone by way of at least one channel through said dam which is submerged within said bath during a portion of each revolution;

introducing materials selected from the group comprising fluxes and additive reagents into said gas-liquid reaction zone forming a layer of slag within said gas-liquid reaction zone having a different composition than said slag contained in said gas-solid-liquid reaction zone; discharging slag as required through said annular end opening adjacent to said gas-solid-liquid reaction zone; and discharging hot liquid metal from said gas-liquid reaction zone.

18. A process according to any one of claims 1 to 8 including recirculating a portion of the off-gases to comprise a portion of said hot gas stream.

* * * * *